(12) United States Patent
Min (10) Patent No.: US 9,620,753 B2
(45) Date of Patent: Apr. 11, 2017

(54) BATTERY

(75) Inventor: Jae Yun Min, Daejeon (KR)

(73) Assignee: SK INNOVATION CO., LTD., Seoul (KR)

(\*) Notice: Subject to any disclaimer, the term of this patent is extended or adjusted under 35 U.S.C. 154(b) by 0 days.

(21) Appl. No.: 14/240,117

(22) PCT Filed: Aug. 8, 2012

(86) PCT No.: PCT/KR2012/006292
§ 371 (c)(1),
(2), (4) Date: Feb. 21, 2014

(87) PCT Pub. No.: WO2013/032145
PCT Pub. Date: Mar. 7, 2013

(65) Prior Publication Data
US 2014/0212710 A1 Jul. 31, 2014

(30) Foreign Application Priority Data

Aug. 30, 2011 (KR) .................. 10-2011-0086812

(51) Int. Cl.
| | | |
|---|---|---|
| *H01M 2/12* | (2006.01) | |
| *H01M 10/52* | (2006.01) | |
| *H01M 2/02* | (2006.01) | |
| *H01M 2/18* | (2006.01) | |
| *H01M 2/34* | (2006.01) | |

(52) U.S. Cl.
CPC ....... *H01M 2/1241* (2013.01); *H01M 2/0207* (2013.01); *H01M 2/12* (2013.01); *H01M 2/18* (2013.01); *H01M 2/348* (2013.01); *H01M 10/52* (2013.01)

(58) Field of Classification Search
None
See application file for complete search history.

(56) References Cited

U.S. PATENT DOCUMENTS 2,922,833 A \* 1/1960 Philipp ........................ 429/56
2006/0204840 A1 9/2006 Jeon et al.
(Continued)

FOREIGN PATENT DOCUMENTS

| CN | 101952994 | 1/2011 |
|---|---|---|
| JP | 10208720 | 8/1998 |

(Continued)

OTHER PUBLICATIONS

Park (KR 10-2004-0110535) (a raw machine translation) (Abstract, Detailed Description, Claims and Drawings) (Dec. 31, 2004).\*

(Continued)

*Primary Examiner* — Miriam Stagg
*Assistant Examiner* — Carmen Lyles-Irving
(74) *Attorney, Agent, or Firm* — Cantor Colburn LLP (57) ABSTRACT

Provided is a battery, and more particularly, a battery in which a cutting unit is formed in a seating groove so that the cutting unit and a sub battery module do not contact each other in a normal operation state, such that the battery may be stably driven, and a pouch of the sub battery module may be cut by the cutting unit only in an abnormal operation state such as over-charging, over-discharging, exposure to a high temperature, an electric short circuit, or the like, to prevent ignition or explosion in advance, such that safety may be improved.

4 Claims, 5 Drawing Sheets (56) References Cited

U.S. PATENT DOCUMENTS

2007/0141452 A1    6/2007  Kim
2009/0061289 A1*  3/2009  Hamada et al. ................ 429/53
2011/0189515 A1    8/2011  Yoon et al.

FOREIGN PATENT DOCUMENTS

| JP | 1998208720 | 8/1998 |
|----|------------|--------|
| JP | 2002093398 | 3/2002 |
| JP | 2007141778 | 6/2007 |
| JP | 2009537944 | 10/2009 |
| KR | 1020040110535 | 12/2004 |
| KR | 1020060099216 | 9/2006 |
| KR | 1020090052802 | 5/2009 |

OTHER PUBLICATIONS

International Search Report—PCT/KR2012/006292 dated Mar. 4, 2013.

\* cited by examiner

BATTERY

TECHNICAL FIELD

The present invention relates to a battery, and more particularly, to a battery in which a cutting unit is formed in a seating groove so that the cutting unit and a sub battery module do not contact each other in a normal operation state, such that the battery may be stably driven, and a pouch of the sub battery module may be cut by the cutting unit only in an abnormal operation state such as over-charging, over-discharging, exposure to a high temperature, an electric short circuit, or the like, to prevent ignition or explosion in advance, such that safety may be improved.

BACKGROUND ART

As the interest in energy and environment was increased, the demand for a secondary battery has been rapidly increased. Particularly, research into a lithium secondary battery having high energy density and discharge voltage has been actively conducted.

Particularly, the lithium secondary battery has been mainly used as a power supply of a mobile phone, a notebook computer, a digital camera, and an electric vehicle.

However, even though the lithium secondary battery has excellent electric characteristics, the lithium secondary battery has low safety characteristics.

More specifically, in the case in which electrolysis reaction continuously occurs in the lithium secondary battery in an abnormal operation state such as over-charging, over-discharging, exposure to a high temperature, and an electrical short circuit, or the like, heat and gas may be generated therein. As a result, when the electrolysis reaction is further promoted at a high temperature and high pressure, ignition or explosion may be generated.

Particularly, this problem may cause a severe major accident in the case of a middle and large-sized battery pack in which a plurality of battery cells are provided.

In the middle and large sized battery pack, the plurality of battery cells or unit modules are provided in a frame having a predetermined space, and as the plurality of battery cells or unit modules are expanded, pressure in a case may be rapidly increased.

In order to solve this problem, the secondary battery module includes a fuse, a bimetal, and a battery management system (BMS). However, sufficient safety may not be secured through only these configurations.

Particularly, in the normal state, the BMS may sense an electrical fault (over-discharging, over-charging, over-current) and control all of the modules to secure the safety, but when the BMS is not operated in the abnormal state, it may be difficult to control all of the modules, and a risk that a plurality of battery cells are expanded to thereby be ignited or be exploded may be increased.

Figure 1:
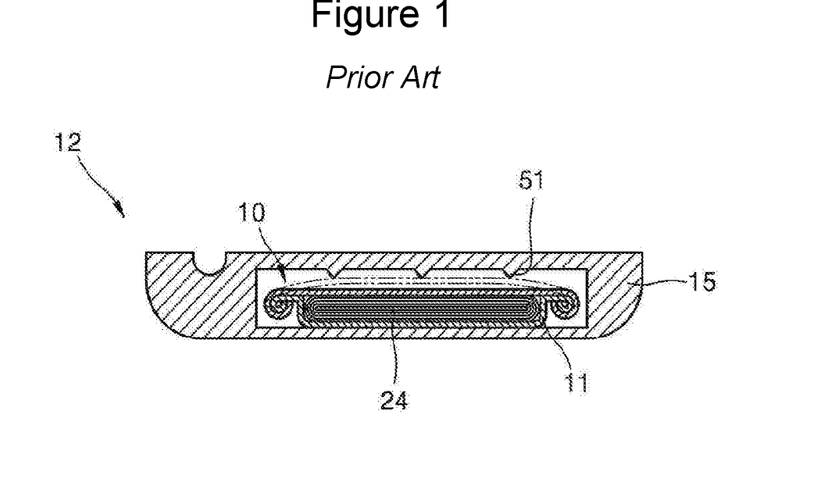
FIG. 1 is a cross-sectional view showing a battery cartridge including a venting jig according to the related art.

In order to solve this problem, Korean Patent Laid-Open No. 10-2004-0110535 entitled "Secondary Battery Assembly with Gas Discharge Mechanism by Case Rupture" has been suggested, which is shown in FIG. 1.

The secondary battery assembly 12 with a gas discharge mechanism by a case rupture is configured to include a case 11, a secondary battery 10 including an electrode assembly 24 received in the case 11, a secondary battery pack 15 in which the secondary battery 10 is embedded, and a protrusion shaped rupture mechanism 51 formed in the secondary battery pack 15.

A change in volume of the secondary battery in the abnormal operation state is shown by a dotted line in FIG. 1.

In the secondary battery assembly with a gas discharging mechanism by a case rupture shown in FIG. 1, when a unit cell is expanded by the abnormal operation, the pouch type battery case may be ruptured by the rupture mechanism, thereby making it possible to secure the safety.

However, the rupture mechanism is formed in a space in which the secondary battery is received, such that it is likely to damage the case at the time of assembling the unit cell, and in the case in which the secondary battery assembly is mounted and then moved or used in an environment in which vibration is frequently generated, the pouch type battery case may be damaged by the rupture mechanism even in the normal operation state.

That is, in the secondary battery assembly with a gas discharging mechanism by a case rupture, in an assembling process or in the normal operation state, durability of the secondary battery may be deteriorated.

RELATED ART DOCUMENT

Patent Document

Korean Patent Laid-open Publication No. 10-2004-0110535 (Dec. 31, 2004)

DISCLOSURE OF INVENTION

Technical Problem

An object of the present invention is to provide a battery in which a cutting unit is formed in a seating groove so that the cutting unit and a sub battery module may not contact each other in a normal operation state, such that the battery is stably driven, and a pouch of the sub battery module may be cut by the cutting unit only in an abnormal operation state such as over-charging, over-discharging, exposure to a high temperature, an electric short circuit, or the like, to prevent ignition or explosion in advance, such that safety may be improved.

Another object of the present invention provides a battery in which the cutting unit is formed in the seating groove so as not to be exposed, such that the sub battery module is not damaged in an assembling process between the sub battery module and a battery module case, thereby making it possible to improve manufacturability.

Solution to Problem

In one general aspect, a battery includes: a sub battery module including at least one battery cell, an electrode tab extended from the battery cell in one direction and, a pouch accommodates the battery cell therein; and a battery module case protecting the sub battery module, wherein a predetermined region of an inner surface of the battery module case is provided with a concave seating groove; and an inner portion of the seating groove is provided with a cutting unit protruding toward the sub battery module to cut the pouch at the time of a contact with the pouch.

The cutting unit may have a height lower than that of the seating groove, such that the cutting unit and the sub battery module may not contact each other at the time of a normal operation of the battery and contact each other at the time of an abnormal operation of the battery.

A plurality of seating grooves may be formed, and the cutting units may be formed in the plurality of seating grooves, respectively.

A plurality of battery module cases may be provided in parallel with each other, and the sub battery modules may be provided in the battery module cases, respectively.

An outer surface of a seating groove of one of the battery module cases facing each other may be positioned so as to contact an outer surface of the other thereof.

The plurality of seating grooves may be formed at the same position in a height direction in one surface and the other surface of the battery module case, and the seating groove formed in one surface of the battery module case and the seating groove formed in the other surface thereof may be spaced apart from each other by a predetermined distance in a width direction.

Advantageous Effects of Invention

Therefore, with the battery according to the exemplary embodiments of the present invention, as the cutting unit is formed in a seating groove, the cutting unit and a sub battery module may not contact each other in the normal operation state, such that the battery may be stably driven, and the pouch of the sub battery module may be cut by the cutting unit only in the abnormal operation state such as over-charging, over-discharging, exposure to a high temperature, an electric short circuit, or the like, to prevent the ignition or the explosion in advance, such that the safety may be improved.

In addition, in the battery according to the exemplary embodiments of the present invention, as the cutting unit is formed in the seating groove so as not to be exposed, the sub battery module may not be damaged in the assembling process of the sub battery module and the battery module case, thereby making it possible to improve manufacturability.

BRIEF DESCRIPTION OF DRAWINGS

The above and other objects, features and advantages of the present invention will become apparent from the following description of preferred embodiments given in conjunction with the accompanying drawings, in which.

DETAILED DESCRIPTION OF MAIN ELEMENTS

1000: Battery
100: Sub Battery module 110: Battery Cell
120: Electrode Tab 130: Pouch
200: Battery Module Case
210: Seating groove
H210: Depth of Seating Groove of Injection Hole
220: Cutting Unit
H220: Height of cutting unit

BEST MODE FOR CARRYING OUT THE INVENTION

Hereinafter, a technical spirit of the present invention will be described in more detail with reference to the accompanying drawings.

Figure 2:
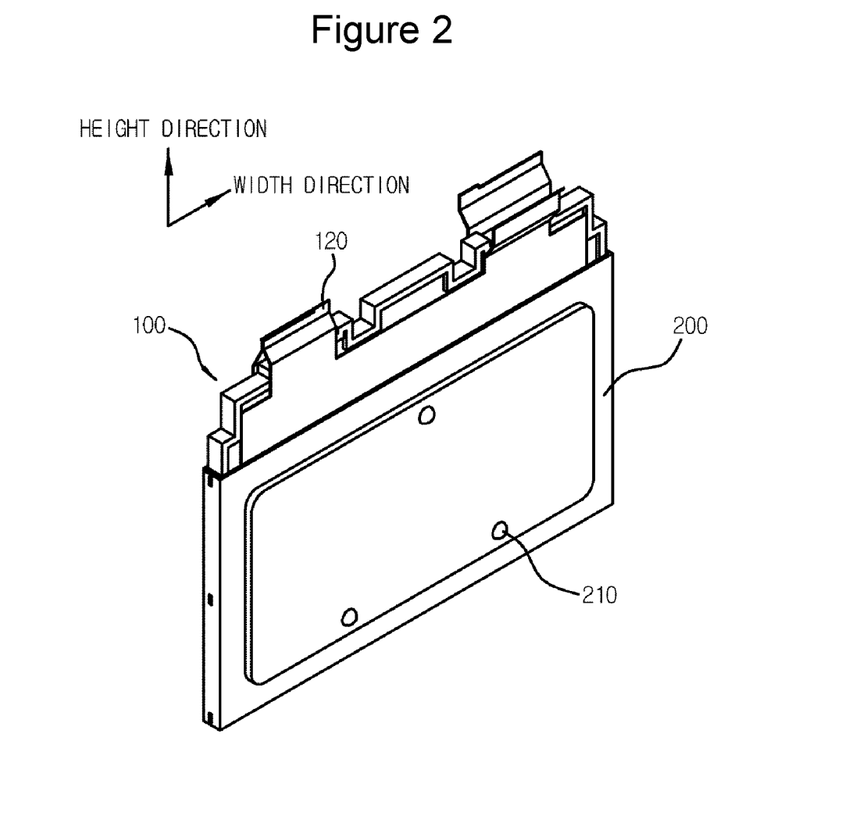
FIG. 2 is a perspective view showing a battery according to an exemplary embodiment of the present invention.
Figure 3:
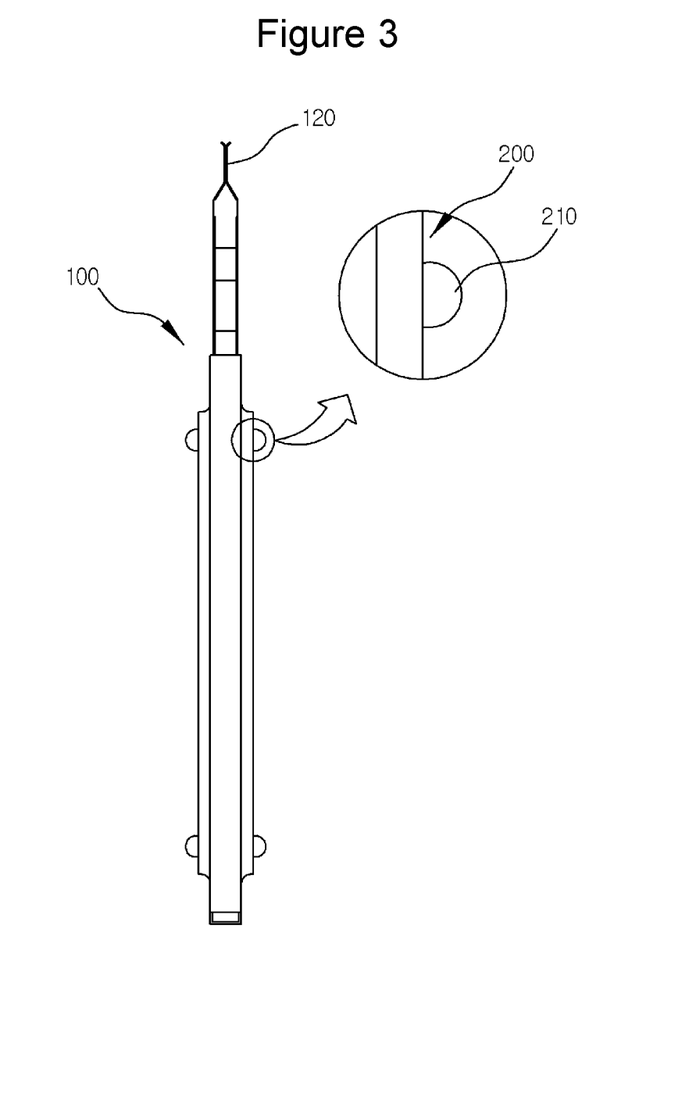
FIG. 3 is a plan view of the battery shown in FIG. 2 viewed in a side direction.
Figure 4:
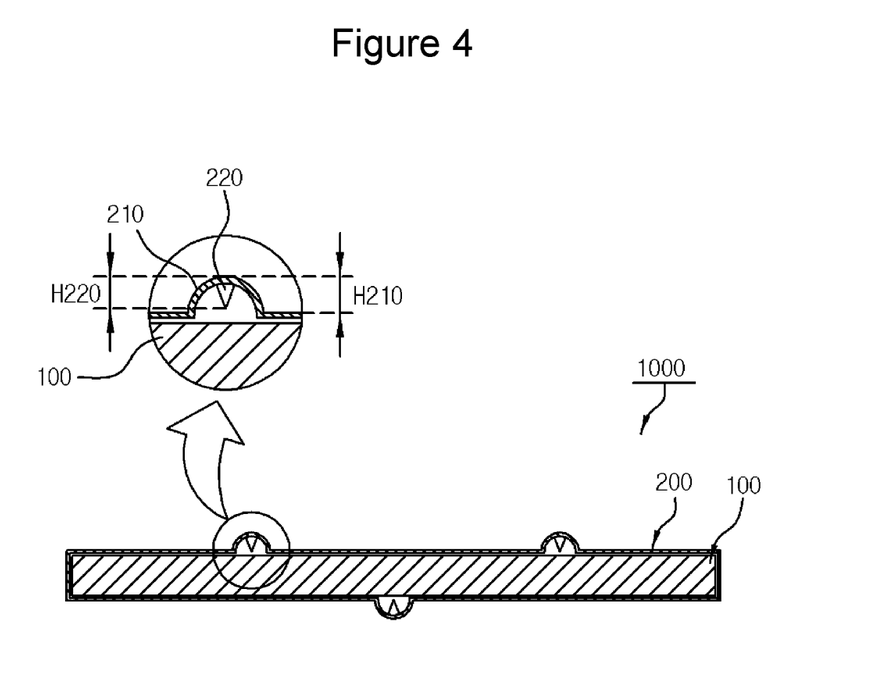
FIG. 4 is a cross-sectional view taken along the line A-A' of the battery shown in FIG. 2.

The battery 1000 according to an exemplary embodiment of the present invention includes a sub battery module 100 and a battery module case 200, wherein the battery module case 200 is provided with a seating groove 210 and a cutting unit 220 (See FIGS. 2 to 4).

Figure 5:
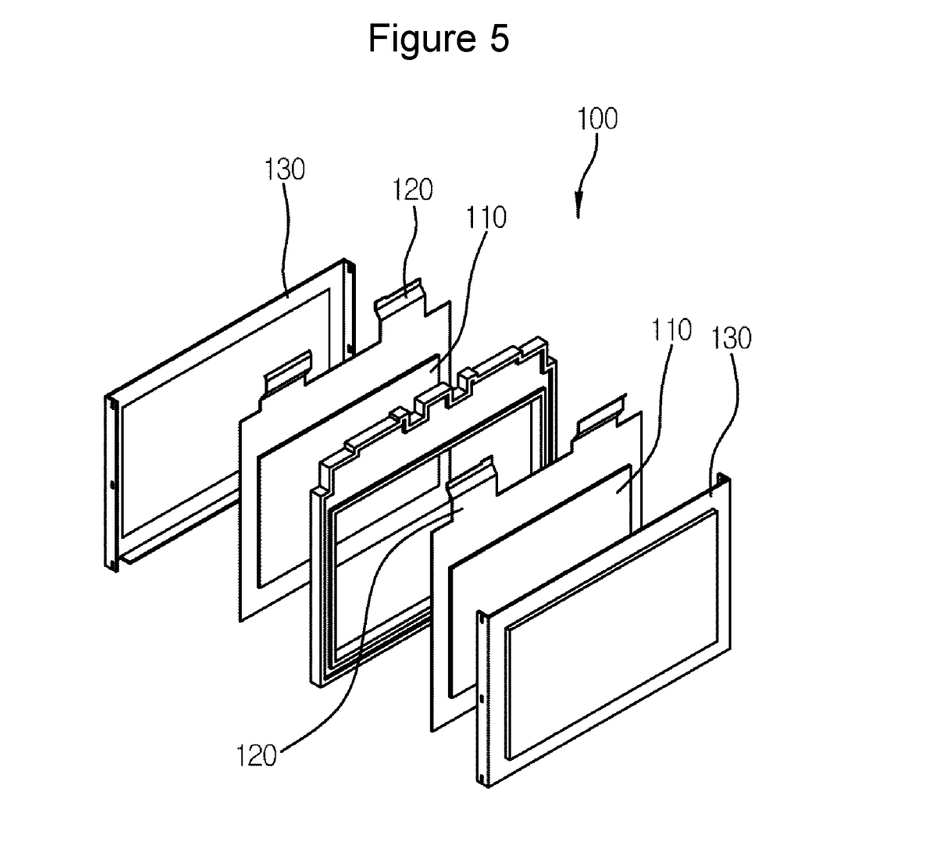
FIG. 5 is an exploded perspective view showing a sub battery module of the battery according to the exemplary embodiment of the present invention.

The sub battery module 100 includes at least one battery cell 110, electrode tabs 120 extended from the battery cell 110 in one direction and a pouch 130 sealed in a state in which it accommodates the battery cell 110 (See FIG. 5). In addition, a pouch 130 having a sheet shape.

The electrode tab 120 is extended from the battery cell 110 in one direction.

The pouch 130 has the sheet shape and is sealed in a state in which it accommodates the battery cell 110 therein. More specifically, the pouch 130 has a shape in which the pouch encloses other surfaces of the battery cell 110 except for a portion at which the electrode tab 120 protrudes and is generally made of aluminum laminate sheet.

Although the sub battery module 100 including a bipolar plate formed therein is shown by way of example in FIG. 5, the present invention is not limited thereto. That is, the sub battery module may have any shape as long as the battery cell 110 is provided in the pouch 130, such as a shape in which the battery cell 110 is wound therein.

Meanwhile, the sub battery module 100 is maintained so that the pouch 130 has a constant volume at the time of a normal operation, but may be expanded by swelling at the time of an abnormal operation such as over-charging, over-discharging, over-current, or the like.

In the battery 1000 according to the exemplary embodiment of the present invention, at the time of the abnormal operation as described above, the pouch 130 of the sub battery module 100 may be cut to prevent ignition or explosion in advance, such that safety may be further improved.

More specifically, in the battery 1000 according to the exemplary embodiment of the present invention, a predetermined region of an inner surface of the battery module case 200 is provided with a concave seating groove 210 and an inner portion of the seating groove is provided with the cutting unit 220 protruding toward the sub battery module 100 to cut the pouch 130 at the time of a contact with the pouch 130.

The seating groove 210, which is a configuration in which the predetermined region of the inner surface of the battery module case 200 is concave, is formed so as to protrude outwardly corresponding to the predetermined region.

In addition, the seating groove 210 for forming a region in which the cutting unit 220 is provided is formed, such that at the time of the normal operation, the cutting unit 220 does not contact the pouch 130 to maintain normal operation of the battery, and at the time of the abnormal operation, the cutting unit 220 contacts the pouch 130 by the expansion of the pouch 130 to cut the pouch 130, thereby allowing the operation of the battery to be stopped.

That is, in the battery 1000 according to the exemplary embodiment of the present invention, a height H220 of the cutting unit is lower than a depth H210 of the seating groove.

In the present invention, the depth H210 of the seating groove means the longest portion in addition to a thickness of a material of the battery module case in a direction perpendicular to the inner surface of the battery module case 200 as shown in FIG. 4.

Further, the height H220 of the cutting unit means the longest portion of the cutting unit 220 in addition to the thickness of the material of the battery module case 200.

In other words, the cutting unit 220 is provided in the seating groove 210, such that when the sub battery module 100 has a normal volume region in the normal state, the cutting unit 220 does not contact the pouch 130, and when the sub battery module 100 is expanded in an abnormal state, the cutting unit 220 contacts the pouch 130 to cut the pouch 130, thereby stopping the operation of the battery.

The cutting unit 220 having a corn shape in which the cutting unit 220 becomes sharper toward an end portion thereof is shown in FIG. 4. In addition, the cutting unit 220 may further have various shapes capable of cutting the pouch 130, for example, a flat shape such as a knife.

In addition, in the battery 1000 according to the exemplary embodiment of the present invention, a plurality of seating grooves 210 may be formed, and the cutting units 220 may be formed in the plurality of seating grooves 210, respectively.

That is, in the battery 1000 according to the exemplary embodiment of the present invention, in order to easily cut the pouch 130 at the time of the abnormal operation, the plurality of seating grooves 210 may be formed in the battery module case 200 supporting the sub battery module 100, and the cutting units 220 may be formed so as to correspond to the seating grooves 210, respectively.

A size of the cutting unit 220 applied in consideration of formation regions of seating grooves 210, the number thereof, or the like.

The cutting unit 220 has the height lower than the depth of the seating groove 210, such that the sub battery module 100 and the cutting unit 220 do not contact each other at the time of the normal operation of the battery 1000 and contact each other at the time of the abnormal operation thereof.

Therefore, in the battery 1000 according to the exemplary embodiment of the present invention, as the cutting unit 220 is formed in the seating groove 210, the cutting unit 220 and the sub battery module 100 may not contact each other in the normal operation state, such that the battery may be stably driven, and the pouch 130 of the sub battery module 100 may be cut by the cutting unit 220 only in the abnormal operation state such as over-charging, over-discharging, exposure to a high temperature, an electric short circuit, or the like, to prevent ignition or explosion in advance, such that safety may be improved.

Meanwhile, in the battery 1000 according to the related art, it is important to stop the operation of the battery at the time of the abnormal operation. However, devices stopping the operation for securing the safety may hinder the normal operation of the battery.

Particularly, in the battery having the shape according to the related art as shown in FIG. 1, it is highly likely to stop the operation of the battery even during the normal operation state, such that it may be difficult to use the battery in a vehicle having a continuous vibration environment, or the like.

In the battery 1000 according to the exemplary embodiment of the present invention capable of solving this problem, the sub battery module 100 is stably supported by the battery module case 200, and the pouch 130 of the sub battery module 100 may be cut by the cutting unit 220 only at the time of the abnormal operation, such that overall stability may be improved.

Figure 6:
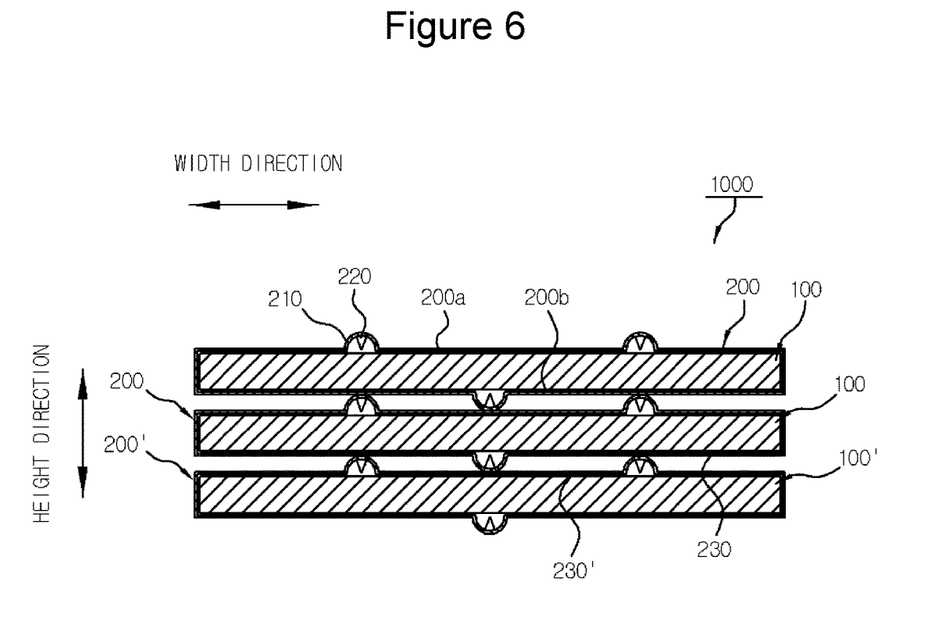
FIG. 6 is a cross-sectional view showing a battery according to another exemplary embodiment of the present invention.

Further, the battery 1000 according to the exemplary embodiment of the present invention may include a plurality of battery module cases 200 to be in parallel with each other, and the sub battery module 100 may be provided in each of the battery module cases 200 as shown in FIG. 6.

Here, the battery module cases 200 may be connected to each other at both end portions thereof or may be fixed by a separate member.

The battery module case 200 support each of the sub battery modules 100, and in the case in which the seating grooves 210 of the battery module cases 200 adjacent to each other are formed at positions corresponding to each other, a distance between the battery module cases 200 may be two times the formation depth of the seating grooves 210.

In the battery 1000 according to the exemplary embodiment of the present invention, the seating grooves 210 of the battery module cases 200 are formed at different positions from each other, the battery module cases 200 may be spaced apart from each other by a distance corresponding to the formation region of a seating groove 210 of one side thereof.

More specifically, in the case in which the seating grooves 210 of the battery module cases 200 facing each other are positioned to contact each other, the number of battery module cases 200 provided in a limited space is reduced. Therefore, in the battery 1000 according to the exemplary embodiment of the present invention, an outer surface of the seating groove 210 of one of the battery module cases 200 facing each other is positioned so as to contact an outer surface of the other thereof, such that a plurality of battery module cases 200 may be provided in the limited space.

In an example shown in FIG. 6, at the same position in a height direction, one side of the battery module case 200 is provided with one seating groove 210 and the other side thereof is provided with two seating grooves 210, having the seating groove 210 of one side of the battery module case 200 therebetween.

That is, in an example of the battery 1000 shown in FIG. 6, a plurality of seating grooves 210 having the same height are formed in one surface 200*a* and the other surface 200*b* of the battery module case 200. Here, the seating groove 210 formed in one surface 200*a* of the battery module case and the seating groves 210 formed in the other surface 200*b* thereof are spaced apart from each other by a predetermined distance in a width direction, and particularly, the seating groove 210 formed in one surface 200*a* of the battery module case and the seating groove 210 formed in the other surface 200*b* thereof are alternately disposed.

As described above in connection with FIGS. 2 to 5 and clearly illustrated in FIG. 6, a battery 1000 according to the present invention includes a first sub battery module 100 and a second sub battery module 100' neighboring with the first sub battery module 100.

The first sub battery module 100 is surrounded and protected by a first battery module case 200. The first battery module case 200 includes a first flat plate 230. The second sub battery module 100' is surrounded and protected by a second battery module case 200'. The second battery module case 200' has a second flat plate 230'.

As illustrated in FIG. 6, the first sub battery module 100 and the second sub battery module 100' are arranged in way that the first flat plate 230 and the second flat plate 230' are in parallel and face each other.

As described above in connection with FIGS. 2-5, the first flat plate 230 protrudes at a predetermined region thereof toward the second flat plate 230' to form a first concave seating groove 210. The second flat plate 230' protrudes at a predetermined region thereof toward the first flat plate 230 to form a second concave seating groove 210.

In the battery 1000 shown in FIG. 6, although the sub battery module 100 has a large size, the pouch 130 of the sub battery module 100 may be easily cut by the cutting unit 220 in the abnormal operation state such as over-charging, over-discharging, exposure to a high temperature, an electric short circuit, or the like, to prevent ignition or explosion in advance, such that safety may be further improved.

Further, the seating groove 210 according to the exemplary embodiment of the present invention is not limited thereto, but may have further various numbers and various patterns.

The present invention should not be construed to being limited to the above-mentioned exemplary embodiment. The present invention may be applied to various fields and may be variously modified by those skilled in the art without departing from the scope of the present invention claimed in the claims. Therefore, it is obvious to those skilled in the art that these alterations and modifications fall in the scope of the present invention.

The accompanying drawings are only examples shown in order to describe the technical idea of the present invention in more detail. Therefore, the technical idea of the present invention is not limited to shapes of the accompanying drawings.

The present invention is not limited to the above-mentioned exemplary embodiments, and may be variously applied, and may be variously modified without departing from the gist of the present invention claimed in the claims.

The invention claimed is:

1. A battery comprising:
a first sub battery module including a first battery cell, an electrode tab extended from the first battery cell in one direction, and a first pouch enclosing the first battery cell;
a first battery module case surrounding and protecting the first sub battery module, the first battery module case having a first flat plate,
a second sub battery module including a second battery cell, an electrode tab extended from the second battery cell in one direction, and a second pouch enclosing the second battery cell; and
a second battery module case surrounding and protecting the second sub battery module, the second battery module case having a second flat plate,
wherein the first sub battery module and the second sub battery module are arranged in way that the first flat plate and the second flat plate are in parallel and face each other,
wherein the first flat plate protrudes at a predetermined region thereof toward the second flat plate to form a first concave seating groove having a first inner space open toward the first pouch, and the second flat plate protrudes at a predetermined region thereof toward the first flat plate to form a second concave seating groove having a second inner space open toward the second pouch, the second concave seating groove being spaced apart from the first concave seating groove; and
wherein a first cutting unit is disposed inside the first inner space, a cutting edge of the first cutting unit being toward the first pouch, and a second cutting unit is disposed inside the second inner space, a cutting edge of the second cutting unit being toward the second pouch.

2. The battery of claim 1, wherein the first cutting unit has a height lower than that of the first inner space, such that the cutting edge of the first cutting unit and the first pouch do not contact each other at the time of normal operation of the battery and contact each other at the time of abnormal operation of the battery.

3. The battery of claim 1, wherein the first concave seating groove includes a plurality of concave seating grooves spaced apart from each other.

4. The battery of claim 3, wherein the second concave seating groove includes a plurality of concave seating grooves spaced apart from each other.

* * * * *